United States Patent
Cosatto et al.

(10) Patent No.: US 11,494,377 B2
(45) Date of Patent: Nov. 8, 2022

(54) MULTI-DETECTOR PROBABILISTIC REASONING FOR NATURAL LANGUAGE QUERIES

(71) Applicant: NEC Laboratories America, Inc., Princeton, NJ (US)

(72) Inventors: Eric Cosatto, Red Bank, NJ (US); Alexandru Niculescu-Mizil, Plainsboro, NJ (US)

(73) Assignee: NEC Corporation

( * ) Notice: Subject to any disclaimer, the term of this patent is extended or adjusted under 35 U.S.C. 154(b) by 274 days.

(21) Appl. No.: 16/819,947

(22) Filed: Mar. 16, 2020

(65) Prior Publication Data

US 2020/0311072 A1 Oct. 1, 2020

Related U.S. Application Data

(60) Provisional application No. 62/827,272, filed on Apr. 1, 2019.

(51) Int. Cl.
*G06F 16/2452* (2019.01)
*G06F 16/242* (2019.01)
(Continued)

(52) U.S. Cl.
CPC ...... *G06F 16/24522* (2019.01); *G06F 16/243* (2019.01); *G06F 16/9024* (2019.01);
(Continued)

(58) Field of Classification Search
CPC ............. G06F 16/24522; G06F 16/243; G06F 16/9024; G06F 16/71; G06F 16/73;
(Continued)

(56) References Cited

U.S. PATENT DOCUMENTS 6,266,053 B1 * 7/2001 French ................. G06T 17/005
345/694
6,912,293 B1 * 6/2005 Korobkin ............... G06T 15/20
382/284

(Continued)

FOREIGN PATENT DOCUMENTS

CN 104462084 A * 3/2015 ....... G06F 16/90324

OTHER PUBLICATIONS

Abhijit Suprem; "Approximate Query Matching for Image Retrieval" School of Computer Science, Georgia Tech Mar. 15, 2018 (Year: 2018).*

(Continued)

*Primary Examiner* — Dennis Truong
(74) *Attorney, Agent, or Firm* — Joseph Kolodka

(57) ABSTRACT

Systems and methods for solving queries on image data are provided. The system includes a processor device coupled to a memory device. The system includes a detector manager with a detector application programming interface (API) to allow external detectors to be inserted into the system by exposing capabilities of the external detectors and providing a predetermined way to execute the external detectors. An ontology manager exposes knowledge bases regarding ontologies to a reasoning engine. A query parser transforms a natural query into query directed acyclic graph (DAG). The system includes a reasoning engine that uses the query DAG, the ontology manager and the detector API to plan an execution list of detectors. The reasoning engine uses the query DAG, a scene representation DAG produced by the external detectors and the ontology manager to answer the natural query.

19 Claims, 7 Drawing Sheets

(51) Int. Cl.
*G06F 16/901* (2019.01)
*G06F 16/2453* (2019.01)
*G06F 16/73* (2019.01)
*G06F 40/205* (2020.01)
*G06F 40/30* (2020.01)
*G06N 7/00* (2006.01)
*G06N 20/00* (2019.01)

(52) U.S. Cl.
CPC .......... *G06F 40/205* (2020.01); *G06N 7/005* (2013.01); *G06N 20/00* (2019.01); *G06F 16/2453* (2019.01)

(58) Field of Classification Search
CPC .. G06F 16/7343; G06F 16/738; G06F 40/205; G06F 40/30; G06F 16/2453; G06N 7/005; G06N 20/00
See application file for complete search history.

(56) References Cited

U.S. PATENT DOCUMENTS

| | | | | |
|---|---|---|---|---|
| 10,168,899 | B1* | 1/2019 | Feiszli | G06F 3/04883 |
| 10,503,775 | B1* | 12/2019 | Ranzinger | G06V 10/464 |
| 10,789,288 | B1* | 9/2020 | Ranzinger | G06K 9/6215 |
| 2004/0249809 | A1* | 12/2004 | Ramani | G06V 30/1988 |
| 2012/0310916 | A1* | 12/2012 | Abadi | G06F 16/2456 |
| | | | | 707/E17.017 |
| 2014/0236578 | A1* | 8/2014 | Malon | G06F 40/30 |
| | | | | 704/9 |
| 2014/0324864 | A1* | 10/2014 | Choe | G06F 16/73 |
| | | | | 707/737 |
| 2015/0331929 | A1* | 11/2015 | El-Saban | G06F 16/50 |
| | | | | 707/739 |
| 2017/0024460 | A1* | 1/2017 | Mac an tSaoir | G06F 16/334 |
| 2017/0124432 | A1* | 5/2017 | Chen | G06T 1/60 |
| 2018/0096192 | A1* | 4/2018 | Sigal | G06V 10/454 |
| 2018/0232648 | A1* | 8/2018 | Acharya | G06N 3/0472 |
| 2019/0278771 | A1* | 9/2019 | Bozkaya | G06F 16/24522 |
| 2020/0311072 | A1* | 10/2020 | Cosatto | G06F 16/73 |
| 2020/0356829 | A1* | 11/2020 | Costabello | G06F 40/30 |

OTHER PUBLICATIONS

Taney et al. "Graph-Structured Representations for Visual Question Answering"; Australian Centre for Visual Technologies the University of Adelaide; 2016 (Year: 2016).*

M. Peng, Q. Lin, Y. Tian, M. Yang, Y. Xiao and B. Ni, "Query expansion based on Conceptual Word Cluster Space Graph," The 5th International Conference on New Trends in Information Science and Service Science, 2011, pp. 128-133. (Year: 2011).*

Jain, A., Mittal, K. & Tayal, D.K. Automatically incorporating context meaning for query expansion using graph connectivity measures. Prog Artif Intell 2, 129-139 (2014). https://doi.org/10.1007/s13748-014-0041-x (Year: 2014).*

Belongie, et al., "Color-and Texture-Based Image Segmentation Using EM and its Application to Content-Based Image Retrieval", Sixth International Conference on Computer Vision, Feb. 1998, pp. 1-8.

Carneiro, et al., "Supervised Learning of Semantic Classes for Image Annotation and Retrieval", IEEE Transactions on Pattern Analysis and Machine Intelligence, Mar. 2007, pp. 394-410, vol. 29, No. 3.

Collobert, et al, "Fast semantic extraction using a novel neural network architecture", 45th Annual Meeting of the Association of Computational Linguistics, Jun. 2007, 8 pages.

Liu, et al., "ConceptNet—a Practical Commonsense Reasoning Tool-Kit, BT technology Journal", Oct. 2004, pp. 211-226, vol. 22, No. 4, 211-226.

Ma, et al., "Attend and Interact: Higher-Order Object Interactions for Video Understanding", arXiv:1711.06330v2 [cs.CV] Mar. 20, 2018, pp. 1-18.

Yikang Li et al. "Scene Graph Generation from Objects, Phrases and Region Captions" in IEEE International Conference on Computer Vision (ICCV), Oct. 22, 2017, pp. 1261-1270 (sections 3.1-3.2, 3.4; and figures 2-4).

Damien Teney et al., "Graph-Structured Representations for Visual Question Answering" in IEEE Conference on Computer Vision and Pattern Recognition (CVPR) Jul. 21, 2017, (pp. 1-9, Sections 1-2 and figure 2).

Chaorui Deng et al. "Visual Grounding via Accumulated Attention" in IEEE Conference on Computer Vision and Pattern Recognition (CVPR), Jun. 18, 2018, (pp. 7746-7755, sections 3.1.2, 3.3).

* cited by examiner

MULTI-DETECTOR PROBABILISTIC REASONING FOR NATURAL LANGUAGE QUERIES

RELATED APPLICATION INFORMATION

This application claims priority to U.S. Provisional Patent Application No. 62/827,272, filed on Apr. 1, 2019, incorporated herein by reference herein its entirety.

BACKGROUND

Technical Field

The present invention relates to video processing and more particularly to searching image media.

Description of the Related Art

Searching image media today is realized using either accompanying captions or image-based queries. Captions, however, are not always present, in particular, for any type of live video applications such as surveillance. As for image-based queries, these require the user to sketch image queries.

SUMMARY

According to an aspect of the present invention, a system is provided for solving queries on image data. The system includes a processor device coupled to a memory device. The system includes a detector manager with a detector application programming interface (API) to allow external detectors to be inserted into the system by exposing capabilities of the external detectors and providing a predetermined way to execute the external detectors. An ontology manager exposes knowledge bases regarding ontologies to a reasoning engine. A query parser transforms a natural query into query directed acyclic graph (DAG). The system includes a reasoning engine that uses the query DAG, the ontology manager and the detector API to plan an execution list of detectors. The reasoning engine uses the query DAG, a scene representation DAG produced by the external detectors and the ontology manager to answer the natural query.

According to another aspect of the present invention, a method is provided for solving queries on image data. The method includes implementing a detector manager with a detector application programming interface (API) to allow external detectors to be inserted into the system by exposing capabilities of the external detectors and providing a predetermined way to execute the external detectors. The method includes implementing an ontology manager that exposes knowledge bases regarding ontologies to a reasoning engine. The method includes implementing a query parser that transforms a natural query into query directed acyclic graph (DAG). The method includes implementing a reasoning engine that uses the query DAG, the ontology manager and the detector API to plan an execution list of detectors. The reasoning engine uses the query DAG, a scene representation DAG produced by the external detectors and the ontology manager to answer the natural query.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
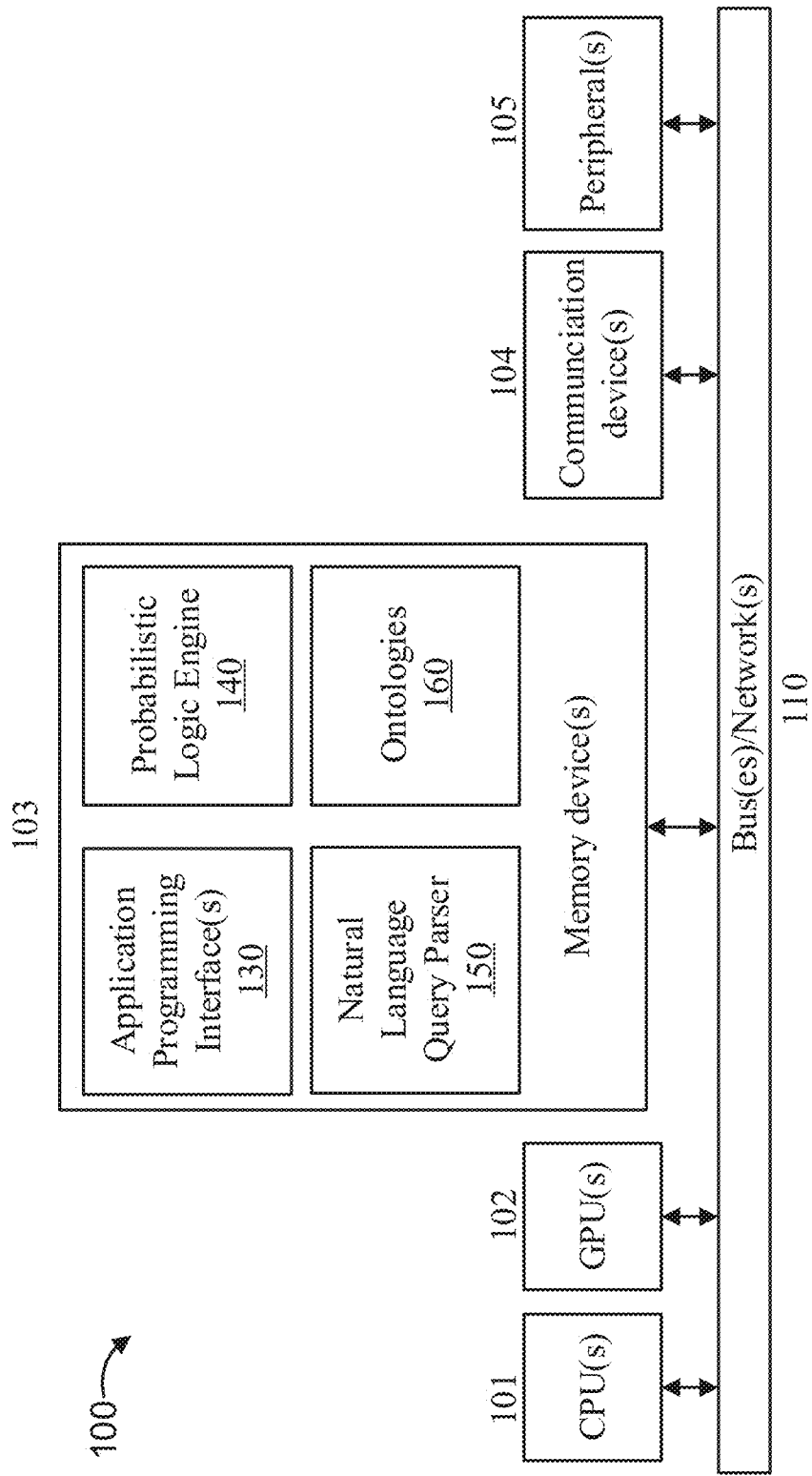
FIG. 1 is a block diagram showing a high-level system for multi-detector probabilistic reasoning, in accordance with an embodiment of the present invention.

In accordance with embodiments of the present invention, systems and methods are provided for solving queries on image data. The systems include a detector manager, an ontology manager, a query parser, and a reasoning engine. The detector manager has a detector application programming interface (API) that allows external detectors to be inserted into the system by exposing capabilities of the detectors and providing a predetermined way to execute the detectors. The ontology manager exposes knowledge bases regarding ontologies to the reasoning engine. The query parser transforms each natural query into a query directed acyclic graph (DAG). The reasoning engine uses the query DAG, the ontology manager and the detector API to plan an execution list of detectors. The reasoning engine can then use the query DAG, a scene representation DAG produced by the detectors and the ontology manager to answer the natural query.

In one embodiment, the system can implement multi-detector probabilistic reasoning. The system can provide immediate answers to complex queries on vast amounts of surveillance data. The system provides a flexible and expandable probabilistic logic framework that goes beyond end-to-end learning approaches by leveraging these approaches in concert with ontologies to solve complex image/video queries. The system is designed to be efficiently tailored to individual needs of specific applications and therefore can be deployed in a short amount of time without requiring a full-fledged supervised training cycle.

Embodiments described herein may be entirely hardware, entirely software or including both hardware and software elements. In a preferred embodiment, the present invention is implemented in software, which includes but is not limited to firmware, resident software, microcode, etc.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a block diagram showing an exemplary processing system 100 for multi-detector probabilistic reasoning, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 store program code for implementing one or more of the following: application programming interfaces (APIs) 130, a probabilistic logic (for example, reasoning) engine 140, a natural language query parser 150, ontologies 160, etc. The ontologies 160 form a knowledge base and encode useful knowledge into logic terms.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
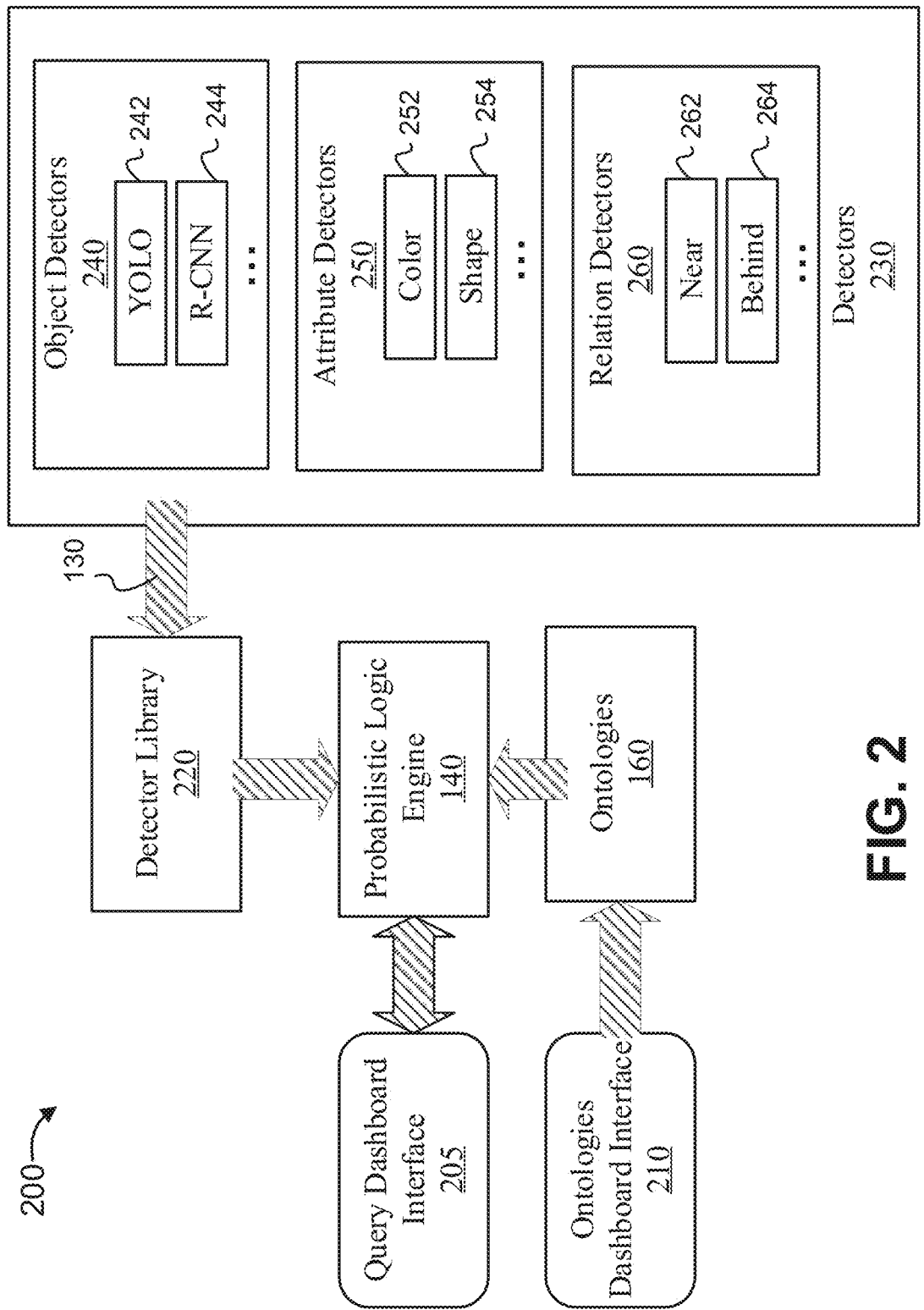
FIG. 2 is a block diagram illustrating a flowchart of a high-level system for multi-detector probabilistic reasoning, in accordance with an embodiment of the present invention.

Referring now to FIG. 2, a block diagram of a high-level system 200 for multi-detector probabilistic reasoning is illustratively depicted in accordance with an embodiment of the present invention. Although a particular number of each type of component and/or layer of the system is illustrated, it should be understood that more or fewer of each component and/or layer.

As shown in FIG. 2, system 200 includes API 130, probabilistic logic engine 140, ontologies 160, a query dashboard interface 205, an ontologies dashboard interface 210, a detector library 220, and detectors 230. System 200 can combine the components into a flexible and expandable software platform.

API 130 (for example, a detector API) can encapsulate detectors 230, such as object detectors 240 (for example, off-the-shelve trained models such as You Only Look Once (YOLO) 242, Regions with convolutional neural networks (R-CNN) 244, Fast R-CNN, Faster R-CNN, etc.).

Probabilistic logic engine 140 includes a natural language query parser and can parse the natural language query received into a directed acyclic graph (DAG) which identifies language elements and groups them hierarchically, such as described below with respect to FIG. 3. A directed acyclic graph is a finite directed graph with no directed cycles. A DAG has finitely many vertices and edges, with each edge directed from one vertex to another, such that there is no way to start at any particular vertex and follow a consistently-directed sequence of edges that eventually loops back to that particular vertex. A DAG is a directed graph that has a topological ordering, a sequence of the vertices such that every edge is directed from earlier to later in the sequence.

Ontologies 160 encode useful knowledge into logic terms (150). Ontologies 160 can extend the capabilities of the detectors 230 by describing higher level concepts in terms of basic objects, thus linking natural language queries to the objects that the detectors 230 can detect.

Query dashboard interface 205 provides an interface for the user to enter the query and, in some embodiments, optionally displays the results of query parsing with an interface to correct the query if needed. The ontologies dashboard interface 210 provides a user interface by which a user can specify which ontologies to use, and, optionally, add new domain knowledge.

Detector library 220 can link concepts from the query with those that can be detected by the detectors 230. Concepts can include objects, attributes and relations. Detectors 230 can include object detectors 240 (for example, different types of object detectors, such as YOLO 242, R-CNN 244, etc.), attribute detectors 250 (for example, different attributes, such as color 252, shape 254, etc.), and relation detectors 260 (for example, different relations, such as near 262, behind 264, etc.).

The example embodiments can leverage (for example, existing, off-the-shelf, proprietary, etc.) trained models (for example, YOLO, R-CNN, etc.) and integrate the models into a probabilistic logic framework (thereby expanding their usefulness). Models can be added to the framework by encapsulating the models into an API 130 that provides a means for a detector 230 to advertise its capabilities in detecting objects, actions, relations or attributes. A user-inputted natural language query can then be parsed and encoded into a set of basic logic facts using the ontologies 160 and the detectors' 230 capabilities. The probabilistic logic engine 140 can solve the set of facts and returns the top matches. The top matches can be determined based on one or more threshold values associated with the objects, actions, relations and attributes, as well as predetermined numbers used to limit (for example, "cap") a volume of answers to a query.

According to example embodiments, probabilistic logic engine 140, a set of detectors 230, and ontologies 160 can be used to solve queries without specific training. Detectors 160 can include pre-trained, off-the-shelves models (and/or proprietary, or trained models, etc.) that are integrated into system 200 via an API 130 that allows the detectors 230 to advertise their capabilities. Ontologies 160 extend the capabilities of the detectors 230 by describing higher level concepts in terms of the basic objects and thereby link the natural language query to the objects that are detectable by the detectors 230. Object relations and attributes are handled in a similar way via detectors 230 and are deduced from the query by NLP parsers.

The system 200 can be applied to realize (determine answers to, results for, etc.) queries efficiently and help retrieve information from video streams for applications (such as security in public spaces). For example, surveillance cameras can produce constant streams of video. The system 200 can be applied to finding useful content, for example, in instances in which most of the content is uninteresting (or not relevant, etc.). The system 200 can find relevant information from video streams in a manner that avoids tedious, time consuming and error-prone work for human operators. The information that the system 200 can be directed to finding can include information based on high-level queries (for example, search instructions) regarding particular objects and/or actions that occur in the video streams. For example, the information hidden in the huge amount of video that an operator wants to retrieve can generally be described in high-level queries, such as "find people falling", "find animal crossing the road", "find tandem motorbikes", etc.

According to example embodiments, the system 200 includes a flexible and expandable probabilistic logic framework that goes beyond end-to-end learning approaches by leveraging them in concert with ontologies 160 to solve complex image/video queries. The system 200 can be efficiently tailored to individual needs of specific applications and therefore can be deployed in a short amount of time without requiring a full-fledged supervised training cycle.

Figure 3:
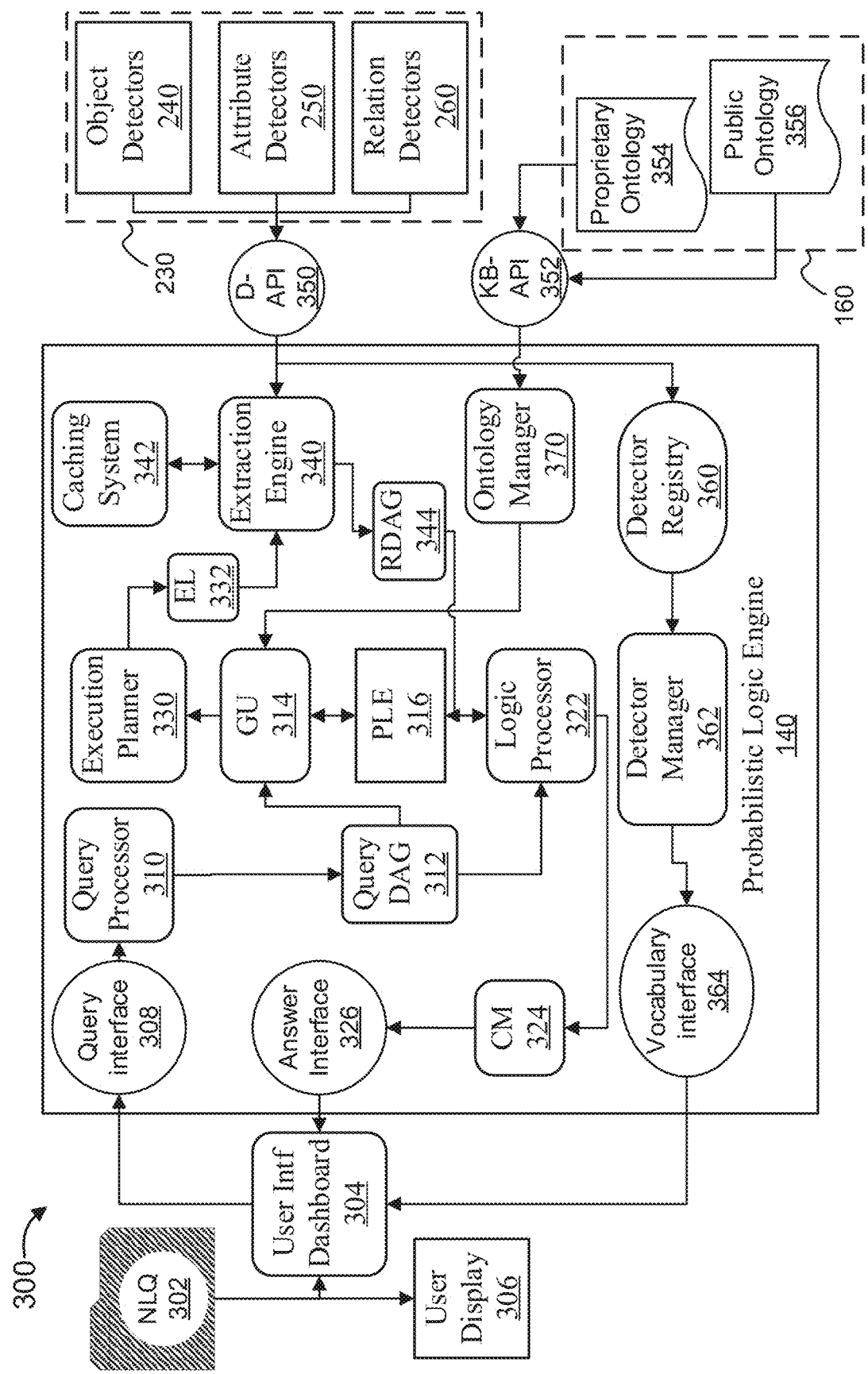
FIG. 3 is a block diagram illustrating components of a probabilistic logic engine, in accordance with an embodiment of the present invention.

Referring now to FIG. 3, a block diagram 300 of components of a probabilistic logic engine 140 and associated interfaces is illustratively depicted in accordance with one embodiment of the present invention.

As shown in FIG. 3, probabilistic logic engine 140 interfaces with a user interface (herein hereafter, "intf") dashboard 304, a detector API (D-API) 350 and a knowledge base (KB) API 352. The user interface dashboard 304 can include, for example, a web server (for example, an ORBIT™ web server) that accesses (for example, receives) answers (via answer interface 326 and collection manager 324) to natural language queries 302 such as "find a person near a white car" and outputs the results of the processing (for example, particular media that match the query) by probabilistic logic engine 140 on a user display 306, such as further described herein below with respect to FIG. 6 by way of non-limiting example. The user interface dashboard 304 can also access a vocabulary interface 364 that is connected to a detector manager 362.

According to example embodiments, the probabilistic logic engine 140 receives the natural language query 302 via a query interface 308. The natural language query 302 is processed via a query processor 310. The probabilistic logic engine 140 (also known as (aka) the "reasoning" engine) can parse the natural language query 302 into a query directed acyclic graph (DAG) 312 which identifies language elements and groups them hierarchically. The QDAG 312 is then translated into logic statements that are appropriate for the particular probabilistic logic engine used. The QDAG 312 is also provided to the grounding unit 314.

Figure 4:
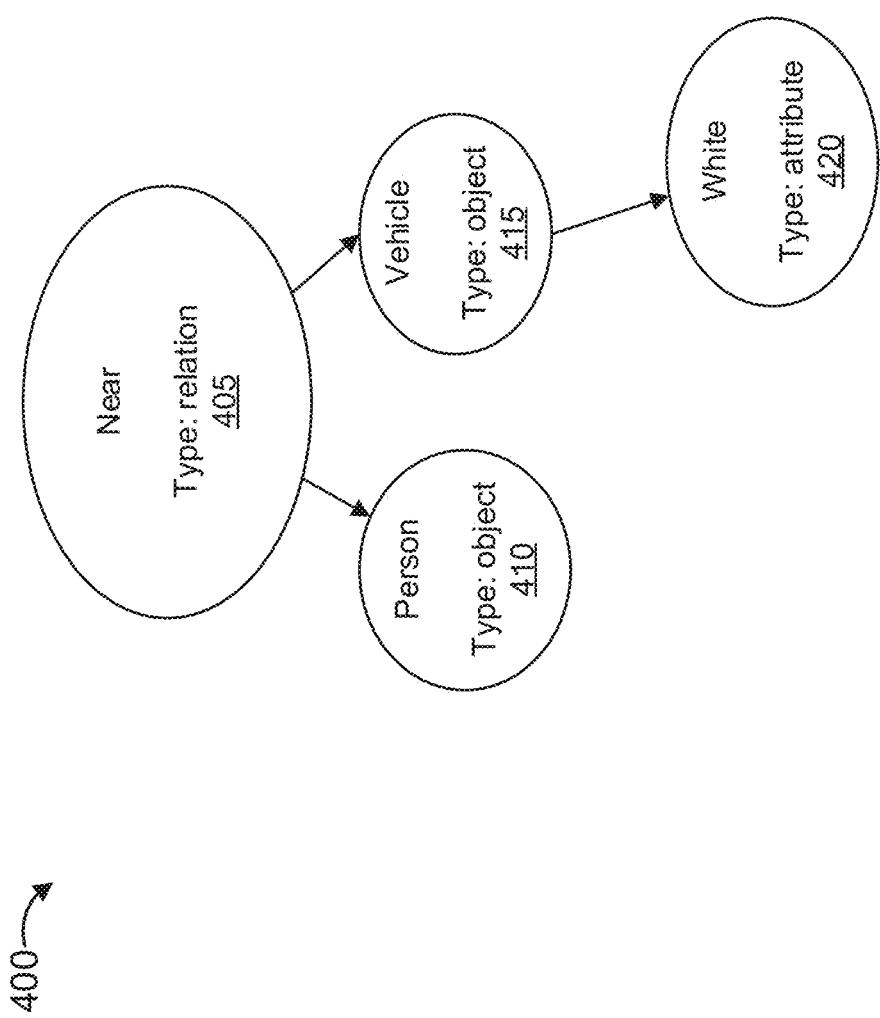
FIG. 4 is a block diagram illustrating a query parsed into a directed acyclic graph (DAG), in accordance with the present principles.

Referring now to FIG. 4, a block diagram 400 illustrating a query parsed into a directed acyclic graph (DAG) is illustratively depicted in accordance with an embodiment of the present invention.

As shown in FIG. 4, a query is provided to illustrate an implementation of the system 200. For example, the system 200 can receive a natural language query 302 such as: "Find a person near a white vehicle". The natural language query 302 is parsed into a DAG 400 by the natural language processing module (query processor 310) (for example, leveraging structural information retrieved by an associated neural network for semantic extraction such as SENNA™). The DAG 400 includes different types of elements, such as relation 405 (near, type: relation), object 410 (person, type: object) and 415 (vehicle, type: object) and attribute 420 (white, type: attribute).

An ontology manager 370 can control access to the ontologies 160. QDAG 312 is then converted into logic facts using rules that depend on the underlying logic engine used (for example, a mechanical translation). Ontologies 160 (such as proprietary ontologies 354, for example, domain specific, semantic templates, detector assignments, etc., and/or public ontologies 356, for example, synonym service, concept relations, ConceptNet Numberbatch™, etc.) can be accessed by ontology manager 370 via knowledge base (KB)-API 352. Ontologies 160 can include a set of concepts and categories in a subject area or domain that shows their properties and the relations between them. The ontology manager 370 can then use ontologies 160 to expand high-level concepts into lower level ones. Concepts include objects, attributes and relations. The detector library 220 is used to link concepts from the parsed query with those that can be detected by the detectors 230.

The query DAG, it's dependencies and data types, as well as the retrieved ontology rules are translated to the corresponding logic language for grounding. In the case of the query DAG 400, the system 200 converts the two query objects 'person' and 'vehicle' to the following logic representation: 'is_a(X, person)', 'is_a(Y, vehicle)', attributes become 'is_of(Y, white)' and relations are encoded to 'is_near(X,Y)'.

The ontology rules from public ontologies (e.g. ConceptNet) 356 and proprietary ontologies 354 are translated into corresponding logic language. For instance, in Problog language, such rules could be:

is_a(X,vehicle):-is_a(X,car).
is_a(X,vehicle):-is_a(X,suv).
is_a(X,vehicle):-is_a(X,automobile).
is_a(X,vehicle):-is_a(X,truck).

The system 200 can include various object and relation extractors (detectors 230), each of which can each advertise detection capabilities. For example, the object detectors 240 can include object detectors such as maskRCNN detector, YOLO detector, Hat detector, torso detector, etc. The attribute detectors 250 can include attribute detectors such as a RGB (red, green and blue) color detector, center color detector, HSV (hue, standard, value) color detector, size detector, etc. The relation detectors 260 can include relation detectors such as a bounding box relation detector, a vicinity detector, etc.

A detector manager 362 can access the D-API 350 to allow external detectors 230 to be inserted into the system by exposing their capabilities and providing a predetermined (for example, standardized, preset, etc.) way to execute them. The detectors 230 can be registered on the detector registry 360. Based on these capabilities, the grounding unit (GU 314) and execution planner 330 determine the appropriate set of object 240, attribute 250 and relation detectors 260 (via D-API 350) to be used in order to answer the query 302.

Grounding unit 314 takes the logic translations of the query, ontology rules and detector capabilities and identifies all possible ways the query might be answered using the existing detectors. The different combinations are recorded and combined into an execution list which is passed to the extraction engine 340 to run the corresponding detectors 230 to answer the query:

The output of the grounding unit 314 is a premature execution list that can then be passed to the execution planner 330 for final assembly and enrichment via Input Backtracking, to ensure that a detector 230 which cannot run on the image bounding box, can receive a bounding box containing an input concept type that it understands. A bounding box can include coordinates of the rectangular border that fully encloses a digital image when it is placed over a bi-dimensional background. Backtracking can include a technique for solving problems recursively by building a solution incrementally, one piece at a time, removing solutions that fail to satisfy the constraints of the problem at any point of time. For example, detection of a first type of object can be contingent on detection of a second type of object in association with the first type of object. For example, for a hat detector that can only run on the concept 'Person', a person detector will be added to the execution list such that the extraction engine 340 will be able to run both (for example, to identify a person and a corresponding hat). In this instance, the detector can be specifically trained to only find hat's on people's heads (for example, the contingency can also be relative position dependent).

The finalized execution list 332 is then passed to the extraction engine 340 which dispatches the right bounding boxes to the corresponding detectors 230, while minimizing overhead to run via keeping track of detection history, caching previous detections (for example, using caching system 342) and batch processing in instances in which the detector 230 provides that feature. The extraction engine 340 executes the different detectors 230 and registers all detections into the representation DAG 344 of the corresponding image. The fully populated representation DAG 344 is consisting of all found objects, their attributes and relations.

Figure 5:
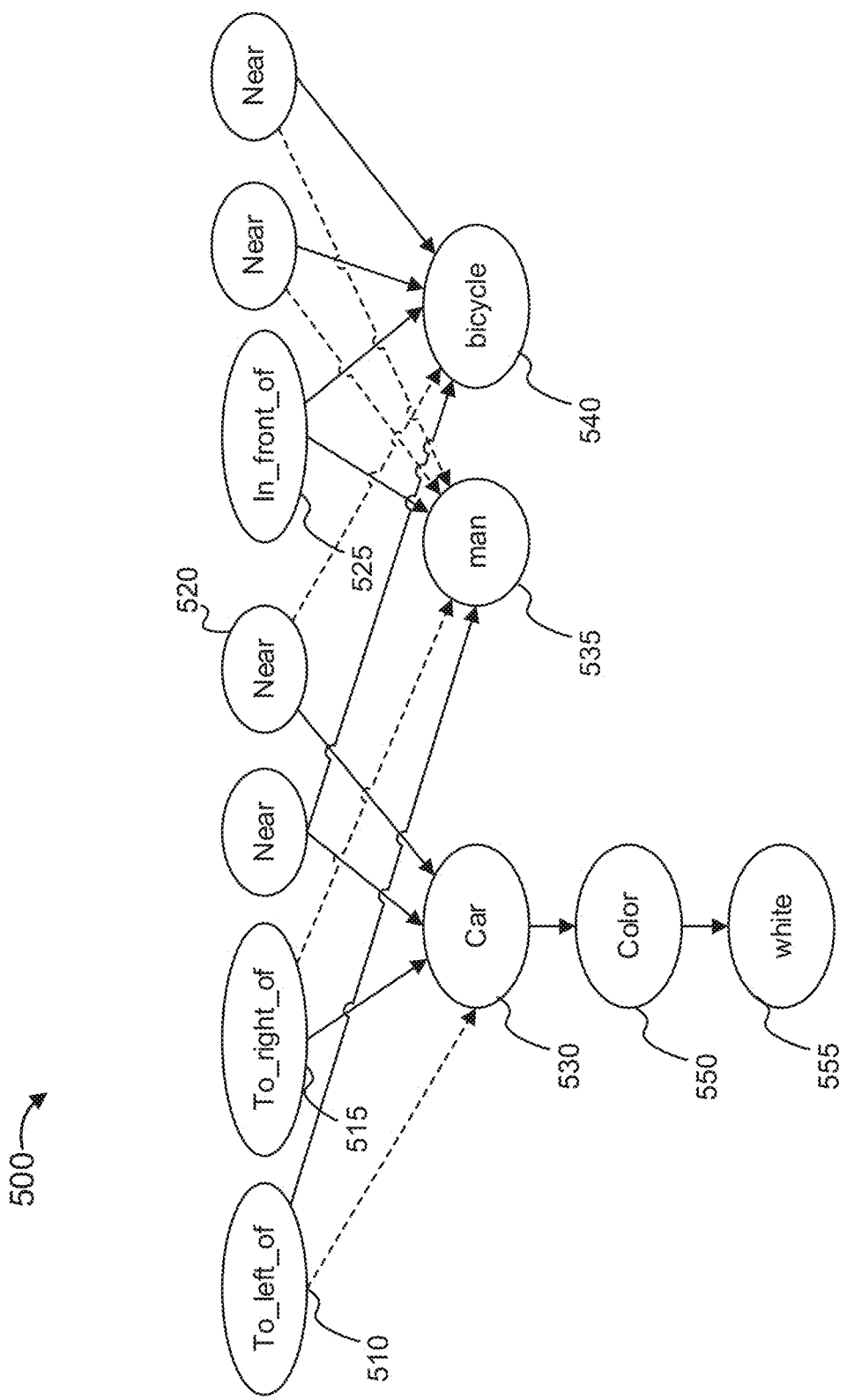
FIG. 5 is a block diagram illustrating a DAG of objects, attributes and relations in a scene, in accordance with an embodiment of the present invention.
Figure 6:
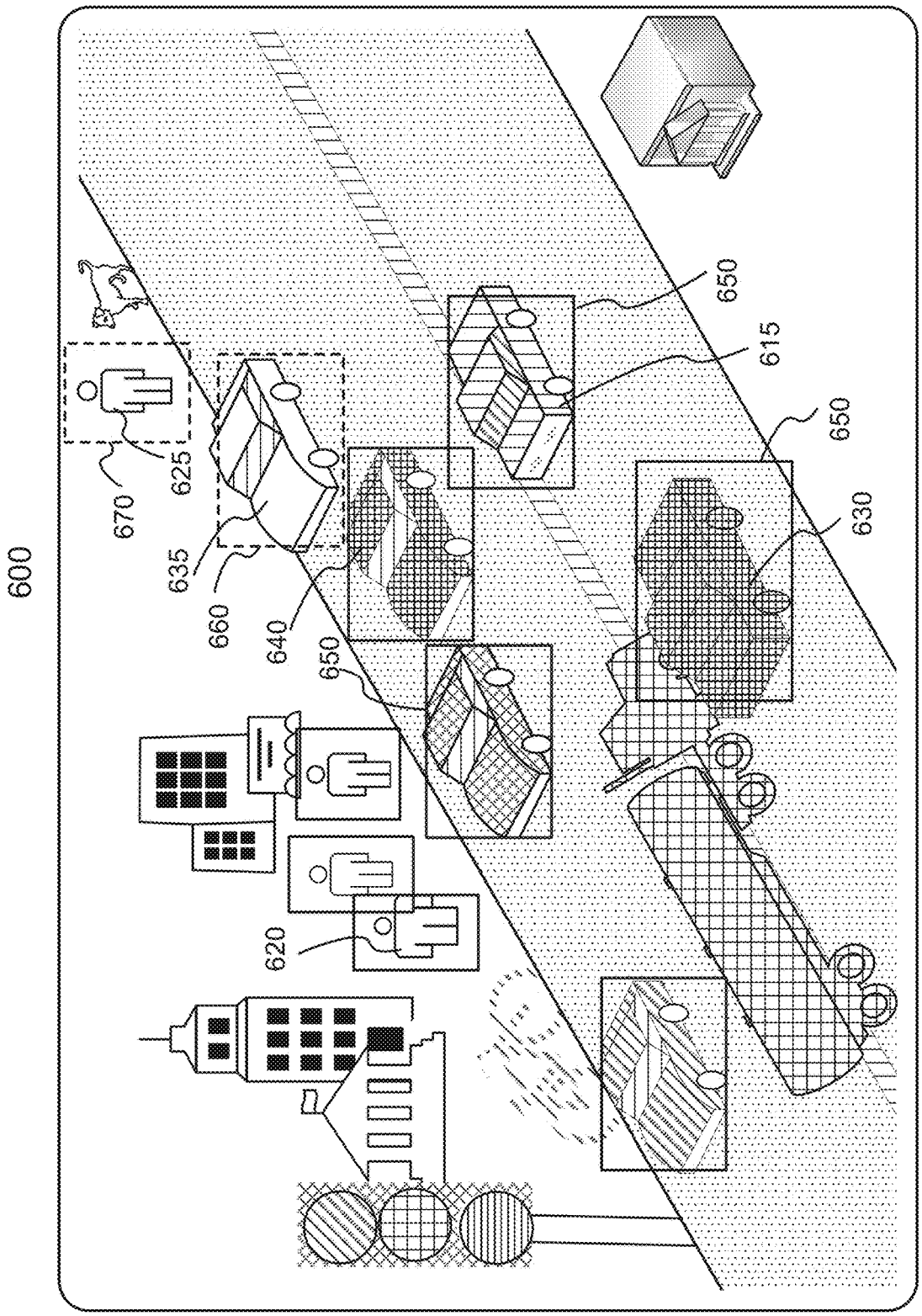
FIG. 6 is a block diagram illustrating an image result of a query, in accordance with the present principles.

The result is a representation directed acyclic graph (DAG) 344 of the objects, their attributes and their relations in the scene (for example, a scene as shown in FIG. 6), including the corresponding relations between the objects as shown in FIG. 5. The graph 500 includes relations (for example, to left of 510, to right of 515, near 520, in front of 525, etc.) between objects (for example, car 530, man 535, bicycle 540, etc.) and attributes (color 550, white 555, etc.). Each node may contain additional information such the confidence of the detection, the location (bounding box) of the object detected, the detector used, etc.

The Query DAG 312 from FIG. 3 and the representation DAG 344 (from FIG. 5) are then passed to the logic processor 322 where both are parsed into the corresponding logic language for inference by the probabilistic logic engine 140, where the PLE 316 is used. In the current example, the results can take a similar form as shown in the following, where the probabilities correspond to the confidences reported by the detectors 230 for a given detection:

0.25011::is_a(n5,person).
0.17231::is_a(n7,car).
0.663::is_of(n7,white).
0.027290636064548::is_near(n5,n7).

In this instance, n5 and n7 are the node IDs of the nodes in the representation DAG.

The translation to logic may use the following mapping:
Objects→detector_confidence::is_a(X,object_concept)
Attributes→detector_confidence::is_of(X,attribute_concept)
Relations→detector_confidence::is_relation_concept(X, Y).

The converted facts for each image are then evaluated by the PLE 316 with regard to correspondence to the original query, also taking into account the extending ontological rule set in order to evaluate the probability for the query to be answered successfully.

The result, consisting of answer probability and objects contained in corresponding answer set, is registered by the logic processor 322 in the answer_set field of the representation DAG 344 and handed to the collection manager module 324 which populates the bounding boxes, pixel masks, and labels onto the respective images for presentation. Such a result (answer (ans)) can be represented in a similar manner as follows, where n5 and n7 are the object IDs of the objects involved in the answer set. The number after is the probability assigned by the probabilistic logic.

Result:
ans(n5,n7): 0.00077977395.

FIG. 6 is a block diagram 600 illustrating an image result of a query in accordance with an embodiment of the present invention.

The images finalized by the collection manager 324 are stored to a predefined output location and displayed for the use in the user interface dashboard 304 (for example, of the web interface). The user interface dashboard 304 can be accessed via a graphical user interface of an associated device.

As shown, by way of example, the displayed image includes bounding boxes, pixel masks, and labels. A bounding box 670 (with broken lines to indicate highlighting, for example, via color, luminescence, etc.) is illustrated around the person 625 and another bounding box 660 (with broken lines) identifies a car 635 that the person 625 is "near". Other persons, cars and objects can be identified with different types of bounding boxes 650 (for example, that indicate the type of object that does not meet the criteria of the query). The displayed image can include identifiers for each of the persons and cars corresponding to, for example, identifiers for each object stored in an associated database (not shown).

Figure 7:
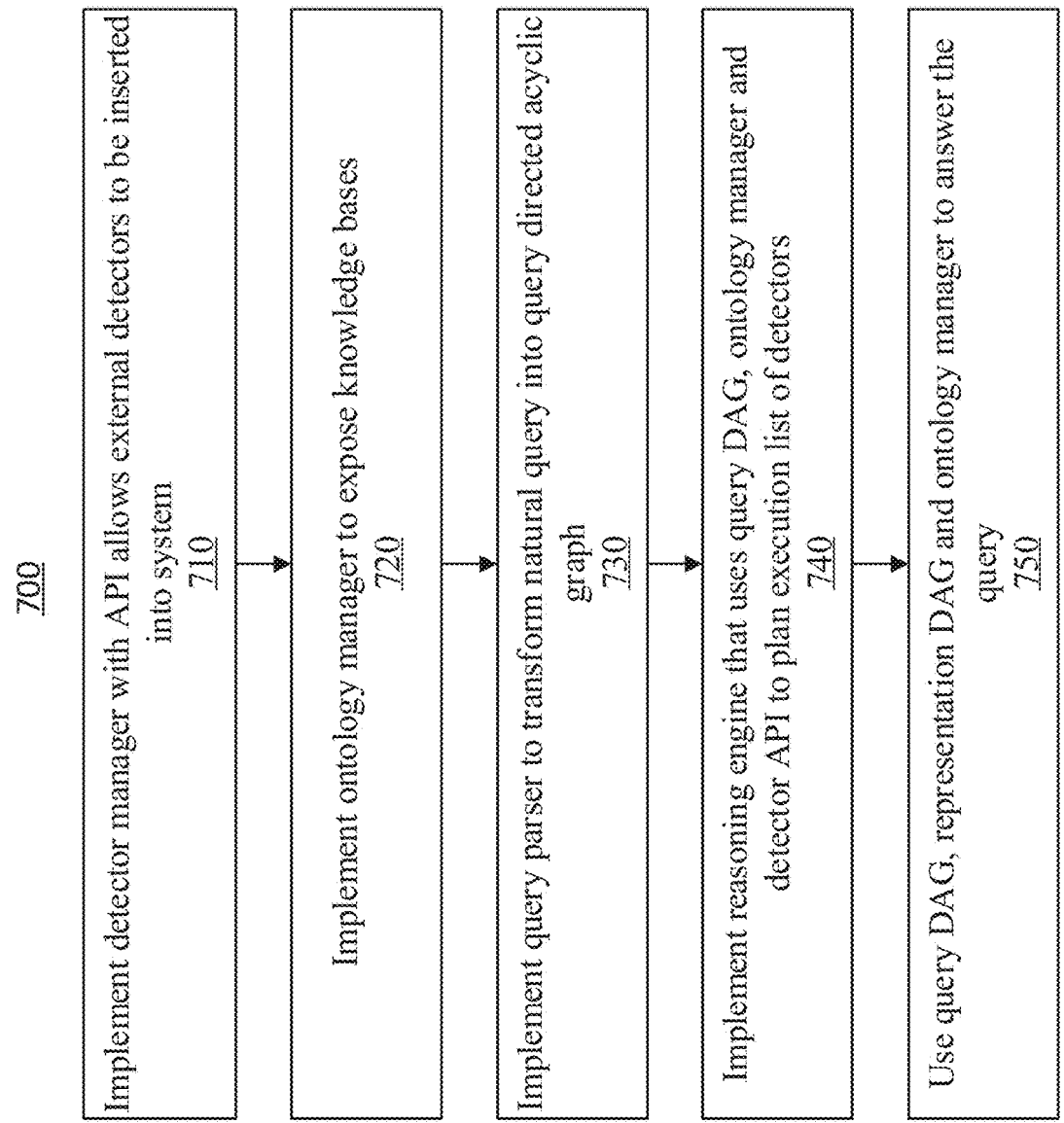
FIG. 7 is a block diagram illustrating a method for solving queries on image data, in accordance with an embodiment of the present invention.

FIG. 7 is a block diagram of a method 700 for solving a query on image data is illustratively depicted in accordance with an embodiment of the present invention.

At block 710, system 200 implements a detector manager 362 with an API (D-API 350) to allow external detectors 230 to be inserted into the system 200 by exposing their capabilities. The detector manager 362 also provides a predetermined way to execute the detectors 230.

At block 720, system 200 implements an ontology manager 370 (for example, that uses ontologies 160 and KB-API 352) that exposes knowledge bases to the reasoning engine 140. The implementation of the reasoning engine 140 can be based on any of the following: Markov Logic Networks, Probabilistic Logic (Problog), Bayesian Logic (BLOG), Probabilistic Similarity Logic (PSL), etc.

At block 730, system 200 implements a query parser (for example, query processor 310) that transforms the natural query 302 into a query directed acyclic graph 312. The query parser can use trained language models to parse the query.

At block 740, system 200 uses the query DAG 312, ontology manager 370 and detector API 350 to plan an execution list of detectors 230.

At block 750, system 200 uses the query DAG 312, scene representation DAG 344 produced by the detectors 230 and the ontology manager 370 to answer the query 302. The system 200 can return answers to the natural query in a predetermined format that highlights subjects of the natural query.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer system for solving queries on image data, comprising:
 a processor device operatively coupled to a memory device, the processor device being configured to implement:
  a detector manager with a detector application programming interface (API) to allow at least one external detector to be inserted into the computer system by exposing capabilities of the at least one external detector and providing a predetermined way to execute the at least one external detector;
  an ontology manager to expose knowledge bases regarding at least one ontology to a reasoning engine;
  a query parser to transform at least one natural query into a query directed acyclic graph (DAG); and the reasoning engine to:
  use the query DAG, the ontology manager and the detector API to plan an execution list of detectors, and
  use the query DAG, a scene representation DAG produced by the at least one external detector and the ontology manager to answer the at least one natural query, wherein the processor is further configured to:
  determine a premature execution list of corresponding detectors to answer the at least one natural query; and
  pass the premature execution list to an execution planner for final assembly and enrichment via input backtracking to ensure that detectors that cannot run on a ROOT image bounding box can receive a bounding box containing an input concept type that the detectors understand.

2. The system of claim 1, where the reasoning engine is a probabilistic logic solver.

3. The system of claim 1, where the query parser is further configured to use at least one trained language model.

4. The system of claim 1, where the at least one ontology extends at least one capability of the at least one detector by describing higher level concepts in terms of basic objects.

5. The system of claim 1, where the detector manager is further configured to encapsulate additional detectors in the detector API.

6. The system of claim 1, where the reasoning engine is further configured to convert the query DAG into logic facts using rules.

7. The system of claim 1, wherein the processor device is further configured to implement:
  a grounding unit that performs query expansion on the query DAG by extending the at least one natural query by related terms retrieved from at least one ontology.

8. The system of claim 7, wherein the processor device is further configured to:
  translate the at least one natural query, at least one dependency and at least one data type, and at least one retrieved ontology rule to a corresponding logic language for grounding.

9. The system of claim 7, wherein the grounding unit is further configured to:
  perform inference passing over all possible combinations to achieve the original query;
  record at least one different combination; and
  combine the at least one different combination into the execution list.

10. The system of claim 1, wherein the processor device is further configured to:
  return answers to the at least one natural query in a predetermined format that highlights at least one subject of the at least one natural query.

11. A method for solving queries on image data, comprising:
  implementing a detector manager with a detector application programming interface (API) to allow at least one external detector to be inserted into the computer system by exposing capabilities of the at least one external detector and providing a predetermined way to execute the at least one external detector;
  implementing an ontology manager to expose knowledge bases regarding at least one ontology to a reasoning engine;
  implementing a query parser to transform at least one natural query into a query directed acyclic graph (DAG);
  determining a premature execution list of corresponding detectors to answer the at least one natural query;
  passing the premature execution list to an execution planner for final assembly and enrichment via input backtracking to ensure that detectors that cannot run on a ROOT image bounding box can receive a bounding box containing an input concept type that the detectors understand; and
  implementing the reasoning engine to:
    use the query DAG, the ontology manager and the detector API to plan an execution list of detectors, and
    use the query DAG, a scene representation DAG produced by the at least one external detector and the ontology manager to answer the at least one natural query.

12. The method of claim 11, wherein the reasoning engine is a probabilistic logic solver.

13. The method of claim 11, further comprising:
using at least one trained language model.

14. The method of claim 11, wherein the at least one ontology extends at least one capability of the at least one detector by describing higher level concepts in terms of basic objects.

15. The method of claim 11, further comprising:
encapsulating, by the detector manager, additional detectors in the detector API.

16. The method of claim 11, further comprising:
converting, via the reasoning engine, the query DAG into logic facts using rules.

17. The method of claim 11, further comprising:
performing, via a grounding unit, query expansion on the query DAG by extending the at least one natural query by related terms retrieved from at least one ontology.

18. The method of claim 11, further comprising:
translating the at least one natural query, at least one dependency and at least one data type, and at least one retrieved ontology rule to a corresponding logic language for grounding.

19. A computer program product for domain adaptation, the computer program product comprising a non-transitory computer readable storage medium having program instructions embodied therewith, the program instructions executable by a computing device to cause the computing device to perform the method comprising:
  implementing a detector manager with a detector application programming interface (API) to allow at least one external detector to be inserted into the computer system by exposing capabilities of the at least one external detector and providing a predetermined way to execute the at least one external detector;
  implementing an ontology manager to expose knowledge bases regarding at least one ontology to a reasoning engine;
  implementing a query parser to transform at least one natural query into a query directed acyclic graph (DAG);
  determining a premature execution list of corresponding detectors to answer the at least one natural query;
  passing the premature execution list to an execution planner for final assembly and enrichment via input backtracking to ensure that detectors that cannot run on a ROOT image bounding box can receive a bounding box containing an input concept type that the detectors understand; and implementing the reasoning engine to:
  use the query DAG, the ontology manager and the detector API to plan an execution list of detectors, and
  use the query DAG, a scene representation DAG produced by the at least one external detector and the ontology manager to answer the at least one natural query.

* * * * *